(12) United States Patent
Ueda

(10) Patent No.: US 11,429,536 B2
(45) Date of Patent: Aug. 30, 2022

(54) STORAGE DEVICE WHICH SELECTS WRITE SCHEME BASED ON MEASURED TEMPERATURE AND CONTROL METHOD

(71) Applicant: Kioxia Corporation, Tokyo (JP)

(72) Inventor: Yasuyuki Ueda, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 69 days.

(21) Appl. No.: 17/017,982

(22) Filed: Sep. 11, 2020

(65) Prior Publication Data

US 2021/0216472 A1  Jul. 15, 2021

(30) Foreign Application Priority Data

Jan. 15, 2020  (JP) .............................. JP2020-004298

(51) Int. Cl.
| | | |
|---|---|---|
| *G06F 12/00* | (2006.01) | |
| *G06F 12/1045* | (2016.01) | |
| *G06F 12/02* | (2006.01) | |
| *G06F 11/30* | (2006.01) | |
| *G06F 11/07* | (2006.01) | |

(52) U.S. Cl.
CPC ........ *G06F 12/1045* (2013.01); *G06F 11/076* (2013.01); *G06F 11/3058* (2013.01); *G06F 11/3089* (2013.01); *G06F 12/0246* (2013.01); *G06F 2212/7201* (2013.01)

(58) Field of Classification Search
CPC .............. G06F 12/1045; G06F 11/076; G06F 11/3058; G06F 11/3089; G06F 12/0246; G06F 2212/7201; G06F 2201/81; G06F 2212/7206; G06F 11/3037

USPC ......................................................... 711/154
See application file for complete search history.

(56) References Cited

U.S. PATENT DOCUMENTS

| | | | |
|---|---|---|---|
| 9,928,126 B1* | 3/2018 | Shappir | G06F 11/108 |
| 10,734,087 B2* | 8/2020 | Cohen | G11C 29/028 |
| 2012/0224425 A1* | 9/2012 | Fai | G11C 7/04 |
| | | | 365/185.09 |
| 2018/0068891 A1 | 3/2018 | Gambino et al. | |
| 2018/0268891 A1 | 9/2018 | Li et al. | |
| 2019/0043566 A1 | 2/2019 | Wu et al. | |
| 2020/0394114 A1* | 12/2020 | Lee | G06F 11/3037 |

FOREIGN PATENT DOCUMENTS

JP  2010-092521 A  4/2010

\* cited by examiner

*Primary Examiner* — Mardochee Chery
(74) *Attorney, Agent, or Firm* — Oblon, McClelland, Maier & Neustadt, L.L.P.

(57) ABSTRACT

According to one embodiment, a storage device includes a nonvolatile memory, a sensor measuring temperature, and a controller controlling the nonvolatile memory in accordance with the temperature measured by the sensor. The controller selects a write scheme based on the temperature measured by the sensor at a time of a write process of data with respect to the nonvolatile memory, generates management data including the write scheme with respect to the data, writes the data to the nonvolatile memory in accordance with the write scheme, obtains the write scheme with respect to the data from the management data at a time of a read process of the data, and reads the data from the nonvolatile memory in accordance with the write scheme.

20 Claims, 7 Drawing Sheets

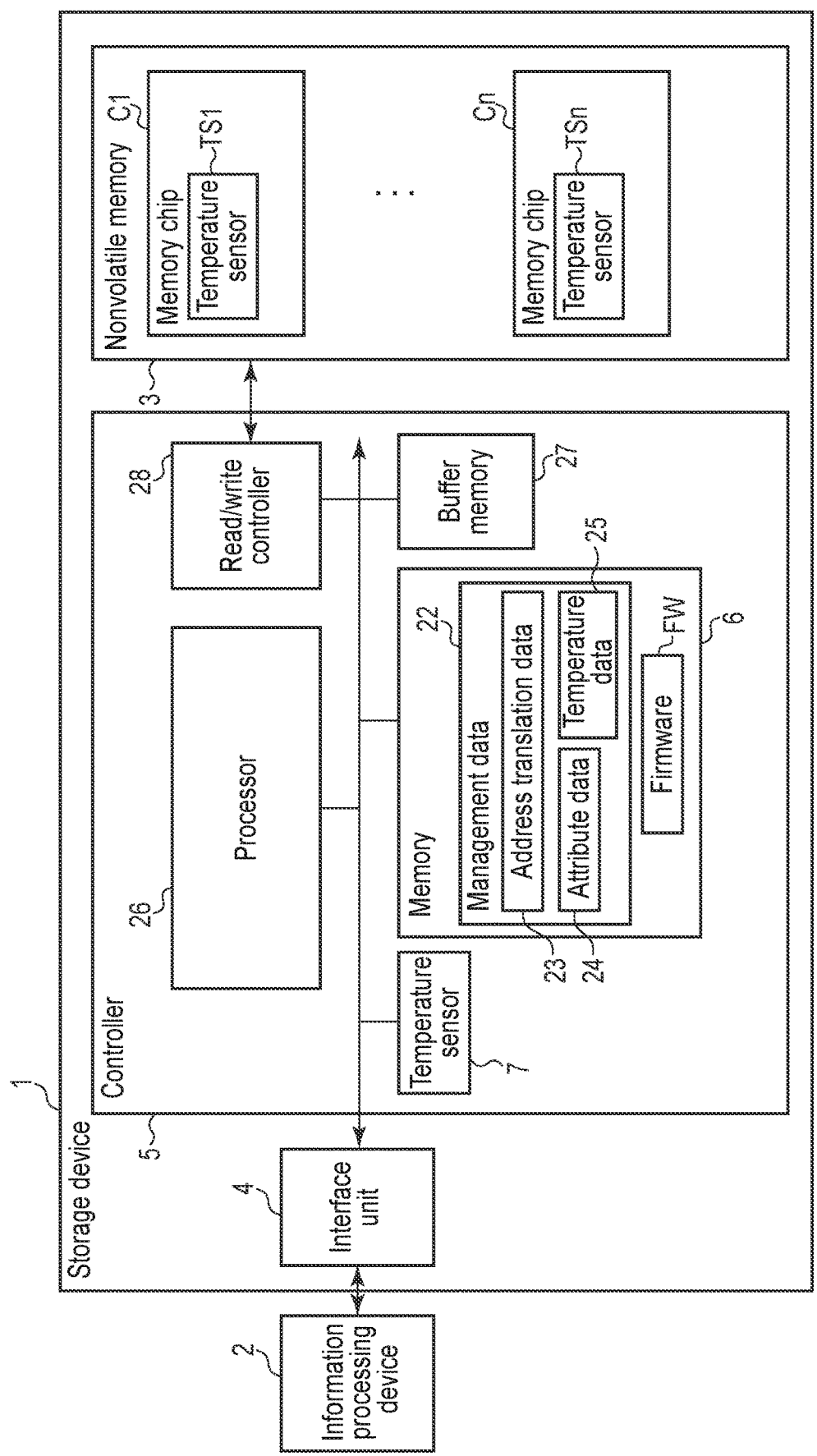
F I G. 1

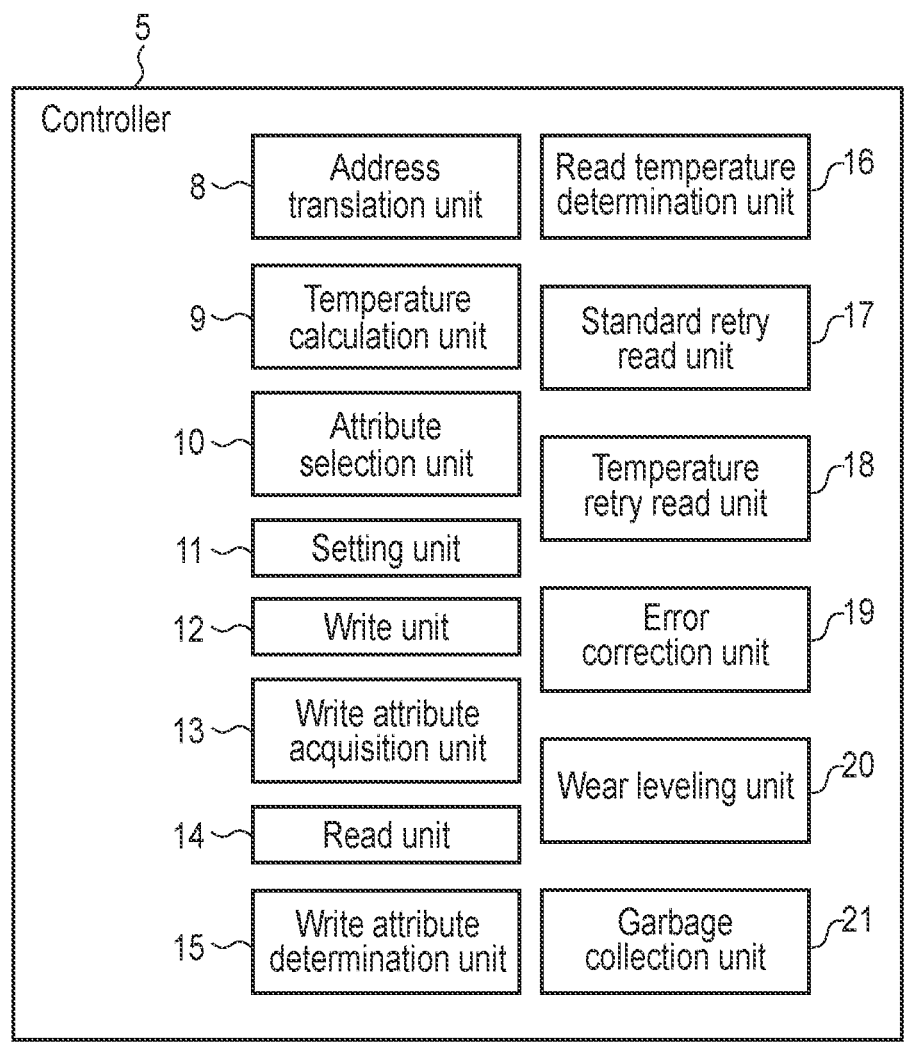
F I G. 2

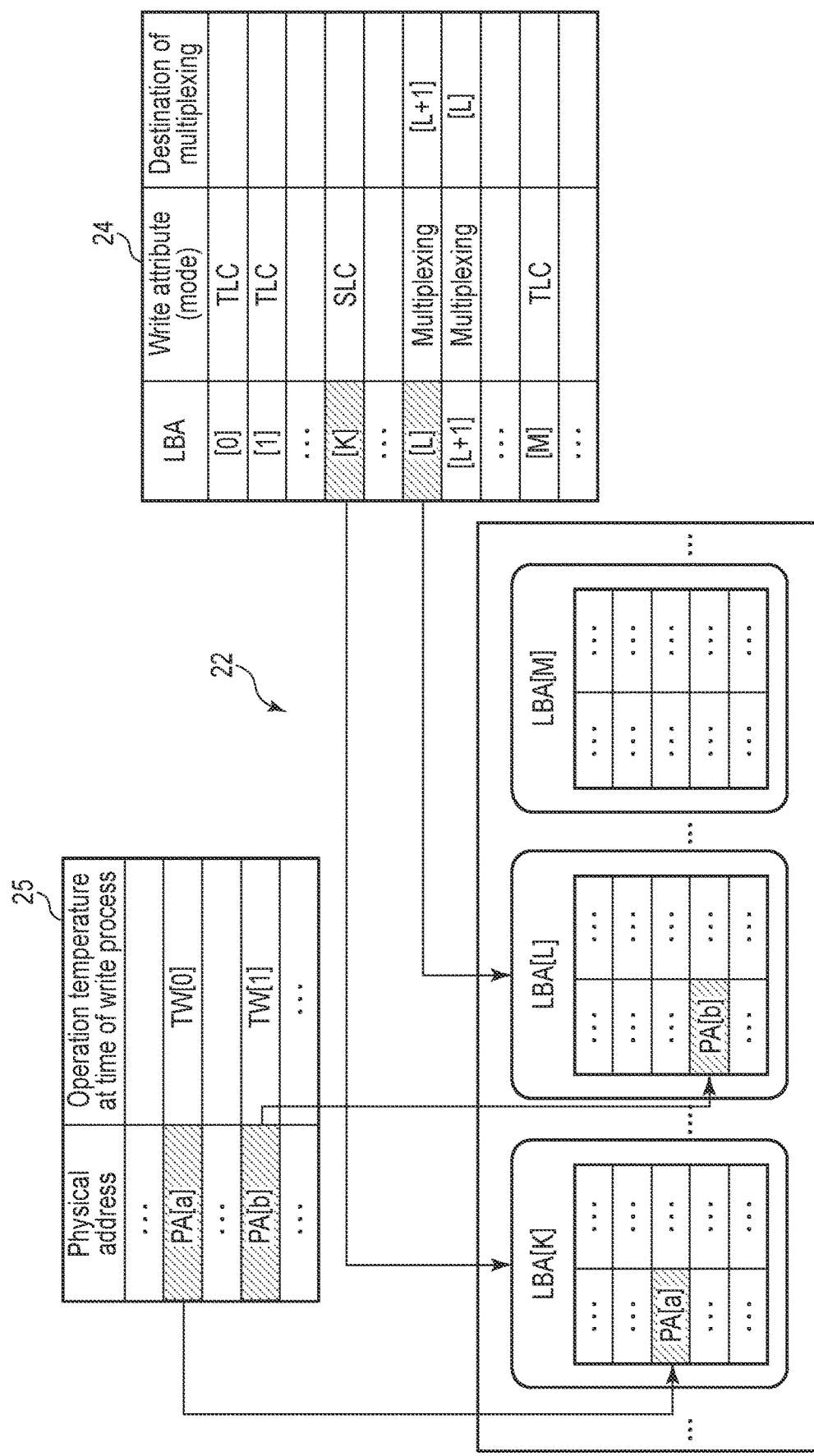
F I G. 3

| State of temperature | Operation temperature (Tw) at time of write process / write mode | Operation temperature (Tr) at time of read process | Temperature-dependent retry read | Standard retry read |
|---|---|---|---|---|
| Pattern P1 | Low temperature / SLC | Low temperature | OFF | ON |
| Pattern P2 | Low temperature / SLC | High temperature | ON | OFF |
| Pattern P3 | High temperature / TLC | Low temperature | OFF | ON |
| Pattern P4 | High temperature / TLC | High temperature | OFF | ON |

F I G. 8

(1)

STORAGE DEVICE WHICH SELECTS WRITE SCHEME BASED ON MEASURED TEMPERATURE AND CONTROL METHOD

CROSS-REFERENCE TO RELATED APPLICATIONS

This application is based upon and claims the benefit of priority from Japanese Patent Application No. 2020-004298, filed Jan. 15, 2020, the entire contents of which are incorporated herein by reference.

FIELD

Embodiments described herein relate generally to a storage device which selects a write scheme based on a measured temperature and control method.

BACKGROUND

A storage device writes data to a nonvolatile memory in accordance with control of a controller. Depending on the temperature at a time of a write process, data stored in the nonvolatile memory may not be normally read. When the data cannot be normally read from the nonvolatile memory, the controller executes retry read and attempts to read normal data.

BRIEF DESCRIPTION OF THE DRAWINGS

FIG. 1 is a block diagram showing an example of a configuration of a memory system according to a present embodiment.

FIG. 2 is a block diagram showing an example of a functional configuration of a controller according to the present embodiment.

FIG. 3 is a diagram showing an example of management data according to the present embodiment.

FIG. 8 is a diagram exemplarily showing the relationships of operation temperature at a time of a write process, operation temperature at a time of a read process, a state of execution of temperature-dependent retry read, and a state of execution of standard retry read.

DETAILED DESCRIPTION

Figure 4:
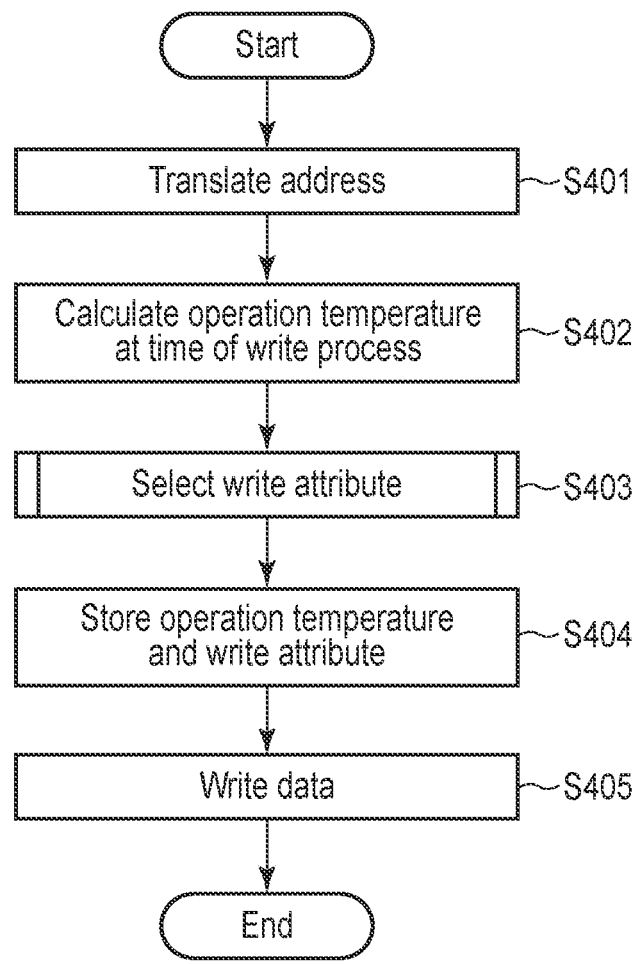
FIG. 4 is a flowchart showing an example of a write process of the storage device according to the present embodiment.

An embodiment will be described hereinafter with reference to the accompanying drawings. In the following description, constituent elements having substantially the same function and configuration will be denoted by the same reference number, and description will be repeated only when necessary. Further, the following embodiment illustrates a device and a method which give concrete forms to technical ideas, and the technical ideas of the embodiment are not intended to limit materials, shapes, structures, arrangements, etc., of components to those descried below. The technical ideas of the embodiment can be modified in various manners in the scope of patent claims.

In general, according to one embodiment, a storage device includes a nonvolatile memory, a sensor configured to measure temperature, and a controller configured to control the nonvolatile memory in accordance with the temperature measured by the sensor. The controller is further configured to select a write scheme based on the temperature measured by the sensor at a time of a write process of data with respect to the nonvolatile memory, generate management data including the write scheme with respect to the data, write the data to the nonvolatile memory in accordance with the write scheme, obtain the write scheme with respect to the data from the management data at a time of a read process of the data, and read the data from the nonvolatile memory in accordance with the write scheme.

FIG. 1 is a block diagram showing an example of a configuration of a memory system according to a present embodiment. The memory system includes a storage device 1. The storage device 1 is, for example, a solid-state drive (SSD). The storage device 1 may be, for example, a hard disk drive (HDD), a universal serial bus (USB) memory, a memory card, a hybrid storage system including an HDD and an SSD, or an optical disk device. The storage device 1 is communicably connected to an external information processing device 2.

The storage device 1 includes a nonvolatile memory 3, an interface unit 4 and a controller 5.

The nonvolatile memory 3 is, for example, a NAND flash memory. The nonvolatile memory 3 may be another nonvolatile semiconductor memory. For example, the nonvolatile memory 3 may be a NOR flash memory, a magnetoresistive random access memory (MRAM), a phase-change random access memory (PRAM), a resistive random access memory (ReRAM), a ferroelectric random access memory (FeRAM) or a semiconductor memory having a three-dimensional structure. The nonvolatile memory 3 includes a plurality of memory chips C1 to Cn, where n is an integer greater than or equal to 2. One memory chip Cz includes one temperature sensor TSz, where z is one of 1 to n. Temperature sensor TSz measures temperature of corresponding memory chip Cz and outputs a measured value.

Reading data from or writing data to the nonvolatile memory 3 can be executed in a unit referred to as a page. The writing data to the nonvolatile memory 3 may be referred to as programming. Erasing data in the nonvolatile memory 3 can be executed in a unit referred to as a block. One unit of the block includes a plurality of pages. Reading data from or writing data to the nonvolatile memory 3 may be executed in a unit which includes a plurality of pages. Erasing data in the nonvolatile memory 3 may be executed in a unit which includes a plurality of blocks.

The interface unit 4 is a hardware interface communicably connecting the storage device 1 to the information processing device 2. The interface unit 4 may be included in the controller 5.

When the controller 5 receives a command from the information processing device 2 via the interface unit 4, the controller 5 controls the nonvolatile memory 3 in accordance with the received command.

The controller 5 includes a memory 6, a temperature sensor 7, a processor 26, a buffer memory 27 and a read/write controller 28.

The memory 6 is, for example, a dynamic random access memory (DRAM) or a static random access memory (SRAM). The memory 6 is used as, for example, a main memory. For example, the controller 5 is allowed to access the memory 6 at higher speed than the access to the nonvolatile memory 3. The memory 6 stores management data 22 generated by the controller 5. The management data 22 is specifically explained later with reference to FIG. 3.

Temperature sensor 7 measures temperature and outputs a measured value.

The processor 26 executes, for example, firmware FW stored in the memory 6. The processor 26 controls the memory 6, temperature sensor 7, the buffer memory 27, the read/write controller 28, etc.

The buffer memory 27 is, for example, a latch circuit. The buffer memory 27 may be a register, a DRAM, an SRAM, etc. The buffer memory 27 stores data read by the read/write controller 28 from the nonvolatile memory 3. The buffer memory 27 stores data to be written by the read/write controller 28 to the nonvolatile memory 3. For example, the buffer memory 27 is used as a temporary storage area of data exchanged between structural elements of the controller 5.

The read/write controller 28 controls the read and write of data with respect to the nonvolatile memory 3.

The read/write controller 28 controls the erase with respect to the nonvolatile memory 3. Specifically, the read/write controller 28 causes the buffer memory 27 to store the data read from the nonvolatile memory 3. The read/write controller 28 writes the data stored in the buffer memory 27 to the nonvolatile memory 3.

Now, this specification explains a detailed functional configuration of the controller 5. FIG. 2 is a block diagram showing an example of the functional configuration of the controller 5 according to the present embodiment. The controller 5 includes an address translation unit 8, a temperature calculation unit 9, an attribute selection unit 10, a setting unit 11, a write unit 12, a write attribute acquisition unit 13, a read unit 14, a write attribute determination unit 15, a read temperature determination unit 16, a standard retry read unit 17, a temperature retry read unit 18, an error correction unit 19, a wear leveling unit 20 and a garbage collection unit 21. At least a part of the address translation unit 8, the temperature calculation unit 9, the attribute selection unit 10, the setting unit 11, the write unit 12, the write attribute acquisition unit 13, the read unit 14, the write attribute determination unit 15, the read temperature determination unit 16, the standard retry read unit 17, the temperature retry read unit 18, the error correction unit 19, the wear leveling unit 20 or the garbage collection unit 21 may be realized by a structural element different from the controller 5.

For example, when the controller 5 receives a write command, a logical address and data from the information processing device 2 via the interface unit 4, the controller 5 adds an ECC to the data, using the error correction unit 19. The controller 5 translates the logical address into a physical address (address translation), using address translation data 23. The controller 5 performs a process for writing the data to which the ECC is added to a location indicated by the physical address in the nonvolatile memory 3.

The controller 5 manages the address translation data 23 in which the logical address is associated with the physical address.

For example, when the controller 5 receives a read command and the logical address from the information processing device 2 via the interface unit 4, the controller 5 translates the logical address into the physical address (address translation), using the address translation data 23. The controller 5 reads data from a storage location of physical data indicated by the physical address in the nonvolatile memory 3. The controller 5 applies error correction to the read data, using the error correction unit 19. The controller 5 transmits the data to which the error collection has been applied to the information processing device 2 via the interface unit 4.

The address translation unit 8 translates the logical address into the physical address, using the address translation data 23. The physical address designates the storage location of physical data in the nonvolatile memory 3. The controller 5 reads user data from the storage location of the physical data designated by the physical address or writes user data to the storage location of the physical data.

The temperature calculation unit 9 obtains measured values from temperature sensors TS1 to TSn and temperature sensor 7. For example, at a time of a write process, the temperature calculation unit 9 calculates operation temperature based on the measured values obtained from temperature sensors TS1 to TSn and temperature sensor 7. For example, at a time of a read process, the temperature calculation unit 9 calculates operation temperature to be compared with a third threshold in the read temperature determination unit 16 based on the measured values obtained from temperature sensors TS1 to TSn and temperature sensor 7. The operation temperature calculated by the temperature calculation unit 9 may be, for example, a mean value of the measured values obtained from temperature sensors TS1 to TSn and temperature sensor 7. The operation temperature to be calculated by the temperature sensor 9 may be calculated by weighting measured values received from memory chips. The operation temperature to be calculated by the temperature calculation unit 9 may be calculated by making the weight of the measured values of temperature sensors TS1 to TSn greater than the weight of the measured value of temperature sensor 7.

At the time of the write process, the attribute selection unit 10 selects a write attribute (a write scheme, a mode) based on the operation temperature calculated by the temperature calculation unit 9. The write attribute may be a write attribute with high reliability (hereinafter, referred to as a high-reliability write attribute) or a write attribute with reliability lower than that of a high-reliability write attribute but with high data storage efficiency (hereinafter, referred to as a standard write attribute). For the high-reliability write attribute, for example, a single-level cell (SLC) scheme or a multiplexing scheme is used. For the standard write attribute, for example, a multi-level cell (MLC) scheme, a triple-level cell (TLC) scheme or a scheme in which multiplexing is not performed is used. Here, the multiplexing refers to, for example, a scheme in which a plurality of same data items are stored. In the multiplexing, even in a case where some of a plurality of data items become unreadable, if the other data items are readable, data can be extracted. Moreover, in the multiplexing, even in a case where a part of some of a plurality of data items becomes unreadable, data can be extracted by recovering data from the other readable part of the plurality of data items.

The setting unit 11 associates the operation temperature calculated by the temperature calculation unit 9 with the logical address or the physical address and causes the memory 6 to store them as temperature data 25. The setting unit 11 associates the write attribute selected by the attribute selection unit 10 at the time of the write process with the logical address or the physical address and causes the memory 6 to store them as attribute data 24.

At the time of the write process, the write unit 12 writes user data to the location indicated by the physical address of the write destination in the nonvolatile memory 3 by a scheme corresponding to the write attribute selected by the attribute selection unit 10.

At the time of the read process, the write attribute acquisition unit 13 refers to the attribute data 24 and obtains the write attribute associated with the logical address or physical address of a read target.

At the time of the read process, the read unit 14 reads data of a location of the nonvolatile memory 3 indicated by the physical address of a read target in accordance with a scheme corresponding to the write attribute obtained by the write attribute acquisition unit 13.

When the data read by the read unit 14 is not normal, the write attribute determination unit 15 determines whether the write attribute associated with the logical address or physical address of the read target in the management data 22 is the standard write attribute (in other words, the MLC scheme or a TLC scheme) or the high-reliability write attribute (in other words, the SLC scheme or the multiplexing scheme).

When the write attribute determination unit 15 determines that the write attribute is the high-reliability write attribute, the read temperature determination unit 16 determines whether or not the operation temperature at the time of the read process is greater than or equal to the third threshold.

For example, when the data read by the read unit 14 is not normal, and further, the write attribute corresponding to the logical address or physical address of the read target is the standard write attribute, the standard retry read unit 17 executes standard retry read which does not depend on the operation temperature. Standard retry read which does not depend on the operation temperature indicates that, for example, a parameter or reference table is updated without using temperature and read is executed. For example, when the data read by the read unit 14 is not normal, and further, the write attribute corresponding to the logical address or physical address of the read target is the high-reliability write attribute, and further, the operation temperature at the time of the read process is less than the third threshold, the standard retry read unit 17 executes read (standard retry read).

For example, when the data read by the read unit 14 is not normal, and further, the write attribute corresponding to the logical address or physical address of the read target is the high-reliability write attribute, and further, the operation temperature at the time of the read process is greater than or equal to the third threshold, the temperature retry read unit 17 executes temperature-dependent retry read. Temperature-dependent retry read indicates that, for example, a parameter or reference table used for read is updated using temperature and read is executed.

For example, the error correction unit 19 determines whether or not data read by the read unit 14, the standard retry read unit 17 or the temperature retry read unit 18 is normal. For example, the error correction unit 19 applies error correction to the data read by the read unit 14, the standard retry read unit 17 or the temperature retry read unit 18. For example, it is assumed that an error correction code (ECC) is added to the read data. In this case, the error correction unit 19 corrects an error of the read data based on the ECC.

The wear leveling unit 20 performs a process for smoothing the degree of wear of each block in the nonvolatile memory 3 (wear leveling). The wear leveling unit 20 reads data from the nonvolatile memory 3 for wear leveling, and subsequently, writes the data to the nonvolatile memory 3.

The garbage collection unit 21 performs a process for releasing an unnecessary area of the nonvolatile memory 3 (garbage collection). The garbage collection unit 21 reads data from a block of the nonvolatile memory 3 for garbage collection and performs erase for the block and data write to another block.

Now, this specification explains operation of the write attribute acquisition unit 13, the read unit 14, the error correction unit 19, the write attribute determination unit 15, the temperature calculation unit 9, the read temperature determination unit 16, the standard retry read unit 17 and the temperature retry read unit 18 at the time of the read process for wear leveling and garbage collection. At the time of the read process for wear leveling and garbage collection, the write attribute acquisition unit 13 obtains the write attribute of data to be read. The read unit 14 reads the data from the nonvolatile memory 3 in accordance with the write attribute. The error correction unit 19 determines whether or not the read data is normal. The write attribute determination unit 15 determines the write attribute when the read data is not normal. The temperature calculation unit 9 calculates the operation temperature at the time of the read process when the read data is not normal. The read temperature determination unit 16 determines whether or not the operation temperature at the time of the read process is greater than or equal to the third threshold. When the read data is not normal, and further, the write attribute determined by the write attribute determination unit 15 is the standard write attribute, the standard retry read unit 17 executes the standard retry read. When the read data is not normal, and further, the write attribute determined by the write attribute determination unit 15 is the high-reliability write attribute, and further, the operation temperature at the time of the read process is not greater than or equal to the third threshold, the standard retry read unit 17 executes the standard retry read. When the read data is not normal, and further, the write attribute determined by the write attribute determination unit 15 is the high-reliability write attribute, and further, the operation temperature at the time of the read process is greater than or equal to the third threshold, the temperature retry read unit 18 executes the temperature-dependent retry read.

Now, this specification explains operation of the temperature calculation unit 9, the setting unit 11 and the write unit 12 at the time of the write process for wear leveling and garbage collection. At the time of the write process for wear leveling and garbage collection, the temperature calculation unit 9 calculates the operation temperature at the time of the write process. The attribute selection unit 10 selects the write attribute at the time of the write process. The setting unit 11 associates the operation temperature with a logical address or physical address and causes the memory 6 to store them as the temperature data 25. The setting unit 11 associates the write attribute selected by the attribute selection unit 10 with a logical address or physical address and causes the memory 6 to store them as the attribute data 24. The write unit 12 writes data to the nonvolatile memory 3 in accordance with a scheme corresponding to the write attribute selected by the attribute selection unit 10.

Now, the management data 22 is specifically explained. FIG. 3 is a diagram showing an example of data structure of the management data 22 according to the present embodiment.

The controller 5 is allowed to specify the operation temperature or write attribute at the time of a corresponding write process from the logical address or physical address, using the management data 22. For example, when the storage device 1 is activated, the controller 5 reads the management data 22 from the nonvolatile memory 3 and writes the management data 22 to the memory 6. After the management data 22 of the memory 6 is updated, the controller 5 writes the management data 22 of the memory 6 back to the nonvolatile memory 3, for example, at a predetermined time point or before the storage device 1 is stopped.

The management data 22 includes the address translation data 23, the attribute data 24 and the temperature data 25.

In the address translation data 23, the logical address is associated with the physical address. In the present embodiment, the logical address may be logical block addressing (LBA). The physical address corresponding to the logical address may be physical block addressing (PBA). In the address translation data 23, for example, an LBA[K] is associated with a physical address PA[a], and an LBA[L] is associated with a physical address PA[b], and an LBA[M] is associated with a physical address of the nonvolatile memory 3 corresponding to an LBA[M].

In the attribute data 24, a logical address or physical address is associated with a write attribute (mode) with respect to the area indicated by the logical address or physical address. In the attribute data 24, for example, each of LBA[0], LBA[1] and LBA[M] is associated with a TLC scheme. In the attribute data 24, for example, LBA[K] is associated with an SLC scheme. In the attribute data 24, for example, each of LBA[L] and LBA[L+1] is associated with a multiplexing scheme. In the attribute data 24, for example, as a destination of multiplexing, LBA[L+1] is associated with LBA[L] associated with a multiplexing scheme. Similarly, in the attribute data 24, for example, as a destination of multiplexing, LBA[L] is associated with LBA[L+1] associated with a multiplexing scheme. Here, the destination of multiplexing indicates an LBA which stores the same data as the data stored in another LBA in a multiplex scheme. The attribute data 24 of FIG. 3 indicates that the same data is stored in LBA[L] and LBA[L+1].

In the temperature data 25, a logical address or physical address is associated with operation temperature calculated by the temperature calculation unit 9 at a time of a write process corresponding to the logical address or physical address. In the temperature data 25, for example, physical address PA[a] is associated with operation temperature TW[0] at the time of the write process. In the temperature data 25, for example, physical address PA[b] is associated with operation temperature TW[1] at the time of the write process.

FIG. 4 is a flowchart showing an example of a write process of the storage device 1 according to the present embodiment.

For example, when the storage device 1 receives a write command, a logical address of a write destination and user data from the information processing device 2 (start), the address translation unit 8 translates the logical address of the write destination into a physical address of the write destination, using the address translation data 23, and notifies the setting unit 11 and the write unit 12 of completion of address translation (S401). The temperature calculation unit 9 calculates operation temperature at a time of the write process based on measured values obtained from temperature sensors TS1 to TSn and 7, and notifies the attribute selection unit 10 of completion of operation temperature calculation (S402).

When the attribute selection unit 10 receives a notification of the completion of the operation temperature calculation from the temperature calculation unit 9, the attribute selection unit 10 compares the operation temperature at the time of the write process calculated by the temperature calculation unit 9 in S402 with a predetermined threshold, selects a write attribute corresponding to the operation temperature at the time of the write process, and notifies the setting unit 11 and the write unit 12 of completion of write attribute selection (S403). The process for selecting the write attribute is specifically explained later with reference to FIG. 5 and FIG. 6.

When the setting unit 11 receives the completion of the address translation from the address translation unit 8 and further receives the completion of the write attribute selection from the attribute selection unit 10, the setting unit 11 associates the operation temperature calculated in S402 and the write attribute selected in S403 with the logical address received by the storage device 1 from the information processing device 2 or the physical address obtained by the translation of the address translation unit 8 in S401, and causes the memory 6 to store them as the management data 22 (S404).

When the write unit 12 receives the completion of the address translation from the address translation unit 8 and further receives the completion of the write attribute selection from the attribute selection unit 10, the write unit 12 writes the user data to a location indicated by the physical address of the write destination obtained by the translation of the address translation unit 8 in S401 in accordance with a scheme corresponding to the write attribute selected in S403 (S405). Subsequently, the write process is terminated (end).

In the present embodiment, the write process of FIG. 4 may be performed when the storage device 1 receives a write command from the information processing device 2 and stores the user data. The write process of FIG. 4 may be performed when the controller 5 writes user data to the nonvolatile memory 3 in an internal process of the storage device 1.

Figure 5:
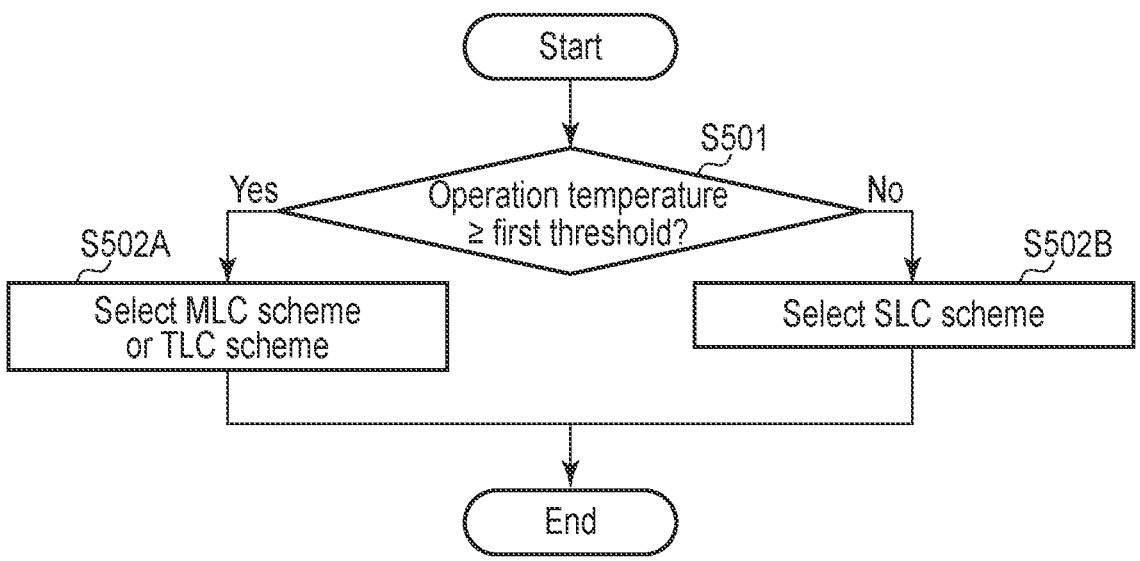
FIG. 5 is a flowchart showing a first example of a process of an attribute selection unit according to the present embodiment.

FIG. 5 is a flowchart showing the first example of a process for selecting a write attribute according to the present embodiment.

When operation temperature at a time of a write process is calculated (start), the attribute selection unit 10 determines whether or not the operation temperature is greater than or equal to a first threshold (S501).

When the operation temperature is greater than or equal to the first threshold, the attribute selection unit 10 selects an MLC scheme or an SLC scheme as a write attribute (S502A). Subsequently, the process is terminated (end).

When the operation temperature is less than the first threshold, the attribute selection unit 10 selects an SLC scheme as a write attribute (S502B). Subsequently, the process is terminated (end).

Figure 6:
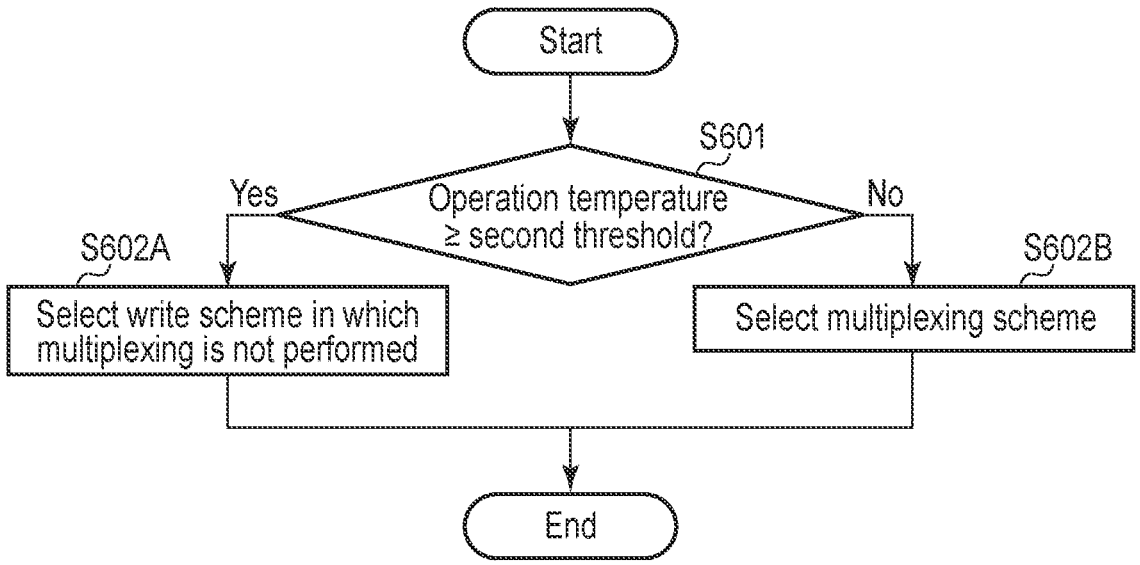
FIG. 6 is a flowchart showing a second example of a process of the attribute selection unit according to the present embodiment.

FIG. 6 is a flowchart showing the second example of a process for selecting a write attribute according to the present embodiment.

When operation temperature at the time of a write process is calculated (start), the attribute selection unit 10 determines whether or not the operation temperature is greater than or equal to a second threshold (S601).

When the operation temperature is greater than or equal to the second threshold, the attribute selection unit 10 selects a scheme in which multiplexing is not performed as a write attribute (S602A). Subsequently, the process is terminated (end).

When the operation temperature is less than the second threshold, the attribute selection unit 10 selects a multiplexing scheme as a write attribute (S602B). Subsequently, the process is terminated (end).

Both the above process of FIG. 5 and the above process of FIG. 6 may be performed to select a write attribute.

Figure 7:
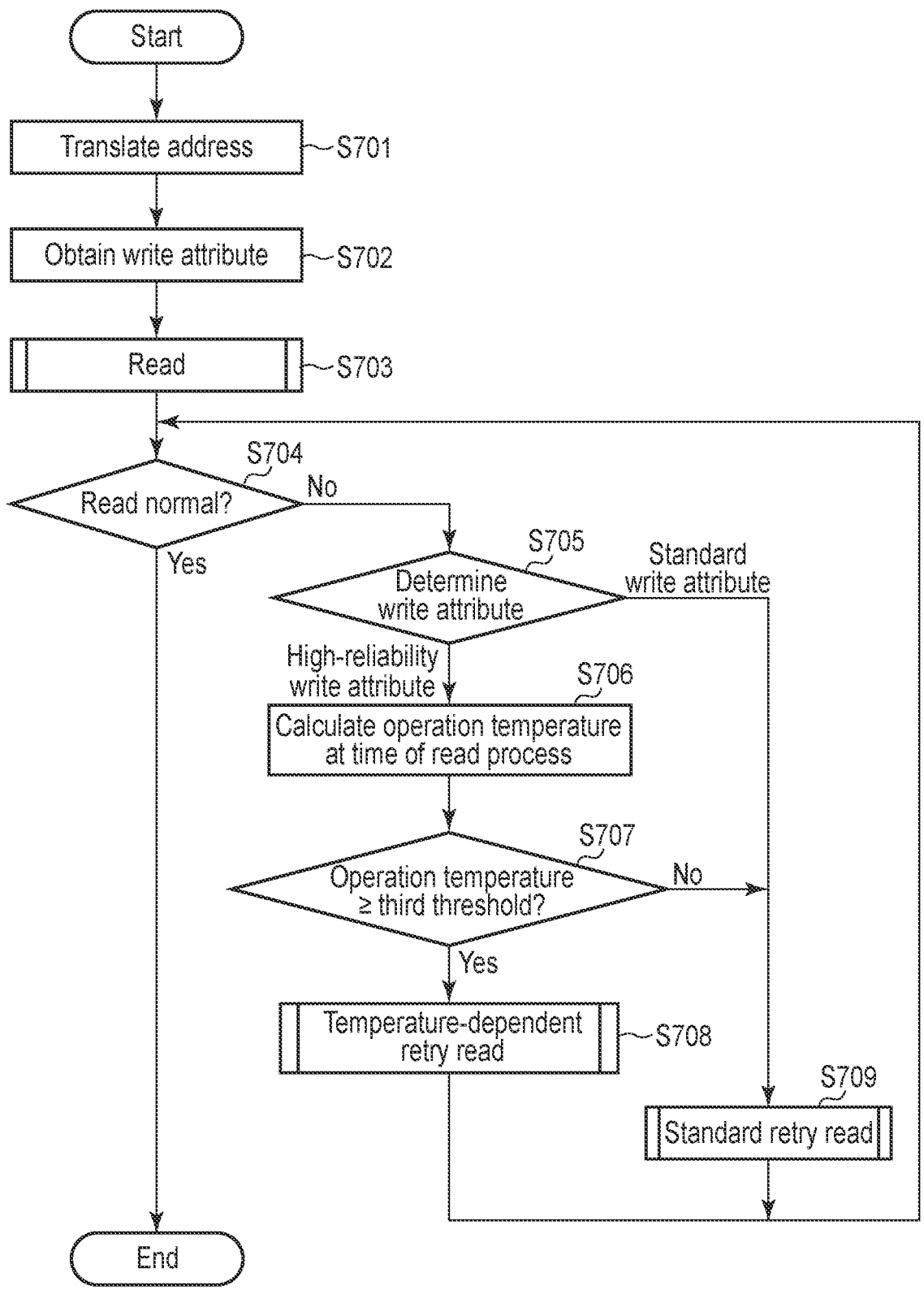
FIG. 7 is a flowchart showing an example of a read process of the storage device according to the present embodiment.

FIG. 7 is a flowchart showing an example of a read process of the storage device 1 according to the present embodiment.

For example, when the storage device 1 receives a read command and a logical address from the information processing device 2 (start), the address translation unit 8 translates the received logical address into a physical address based on the address translation data 23, and notifies the write attribute acquisition unit 13 of completion of address translation (S701).

When the write attribute acquisition unit 13 receives the completion of the address translation from the address translation unit 8, the write attribute acquisition unit 13 refers to the attribute data 24, obtains a write attribute corresponding to the logical address received by the storage device 1 from the information processing device 2 or the physical address obtained by the translation of the address translation unit 8 in S701, and notifies the read unit 14 of completion of write attribute acquisition (S702).

When the read unit 14 receives the completion of the write attribute acquisition from the write attribute acquisition unit 13, the read unit 14 reads data of a location indicated by the physical address obtained by the translation of the address translation unit 8 in S701 in accordance with a scheme corresponding to the write attribute obtained by the write attribute acquisition unit 13 in S702, and notifies the error correction unit 19 of completion of read (S703).

When the error correction unit 19 receives the completion of the read from the read unit 14, the temperature-dependent retry read unit 18 or the standard retry read unit 17, the error correction unit 19 determines whether or not the data read by the read unit 14, the temperature-dependent retry read unit 18 or the standard retry read unit 17 is normal. When the data is not normal, the error correction unit 19 notifies the write attribute determination unit 15 of an execution instruction (S704).

When the data read by the read unit 14, the temperature-dependent retry read unit 18 or the standard retry read unit 17 is normal, the read process is terminated (end).

When the write attribute determination unit 15 receives the execution instruction from the error correction unit 19, the write attribute determination unit 15 obtains a write attribute corresponding to the logical address received by the storage device 1 from the information processing device 2 or the physical address obtained by the translation of the address translation unit 8 in S701 from the attribute data 24. When the obtained write attribute is a high-reliability write attribute, the write attribute determination unit 15 notifies the temperature calculation unit 9 of an execution instruction. When the obtained write attribute is a standard write attribute, the write attribute determination unit 15 notifies the standard retry read unit 17 of an execution instruction (S705).

When the temperature calculation unit 9 receives the execution instruction from the write attribute determination unit 15, the temperature calculation unit 9 calculates operation temperature at a time of the read process and notifies the read temperature determination unit 16 of completion of operation temperature calculation (S706).

When the read temperature determination unit 16 receives the completion of the operation temperature calculation from the temperature calculation unit 9, the read temperature determination unit 16 determines whether or not the operation temperature at the time of the read process is greater than or equal to the third threshold. When the operation temperature at the time of the read process is greater than or equal to the third threshold, the read temperature determination unit 16 notifies the temperature retry read unit 18 of an execution instruction. When the operation temperature at the time of the read process is not greater than or equal to the third threshold, the read temperature determination unit 16 notifies the standard retry read unit 17 of an execution instruction.

When the temperature retry read unit 18 receives the execution instruction from the read temperature determination unit 16, the temperature retry read unit 18 executes temperature-dependent retry read in accordance with the SLC scheme or multiplexing scheme of the write attribute determined by the write attribute determination unit 15 in S705, and notifies the error correction unit 19 of completion of read (S708).

When the standard retry read unit 17 receives the execution instruction from the write attribute determination unit 15, or when the standard retry read unit 17 receives the execution instruction from the read temperature determination unit 16, the standard retry read unit 17 executes standard retry read in accordance with a scheme corresponding to the write attribute determined by the write attribute determination unit 15 in S705, and notifies the error correction unit 19 of completion of read (S709).

In the read process of FIG. 7, temperature-dependent retry read is executed when the write attribute is the high-reliability write attribute. When the write attribute is the standard write attribute, temperature-dependent retry read is skipped and is not performed.

In the present embodiment, the read process of FIG. 7 may be performed when the storage device 1 receives the read command from the information processing device 2 and reads data from the nonvolatile memory 3. The read process of FIG. 7 may be performed when the controller 5 reads data from the nonvolatile memory 3 in an internal process of the storage device 1.

Examples of the internal process of the storage device 1 include wear leveling by the wear leveling unit 20, garbage collection by the garbage collection unit 21 and other background operations.

FIG. 8 is a diagram exemplarily showing the relationships of operation temperature at a time of a write process, operation temperature at a time of a read process, a state of execution of temperature-dependent retry read and a state of execution of standard retry read.

In FIG. 8, a case where operation temperature (Tw) at a time of a write process is less than the first threshold is indicated as low temperature. An SLC scheme is associated with a write attribute when the operation temperature at the time of the write process is the low temperature. A case where the operation temperature at the time of the write process is greater than or equal to the first threshold is indicated as high temperature. An TLC scheme is associated with a write attribute when the operation temperature at the time of the write process is the high temperature.

In FIG. 8, a case where operation temperature (Tr) at a time of a read process is less than the third threshold is indicated as low temperature. A case where the operation temperature at the time of the read process is greater than or equal to the third threshold is indicated as high temperature.

As in pattern P1, when the operation temperature at the time of the write process is the low temperature, and the operation temperature at the time of the read process is the low temperature, the controller 5 does not execute the temperature-dependent retry read and executes the standard retry read.

As in pattern P2, when the operation temperature at the time of the write process is the low temperature, and the operation temperature at the time of the read process is the high temperature, the controller 5 executes the temperature-dependent retry read and does not execute the standard retry read.

As in pattern P3, when the operation temperature at the time of the write process is the high temperature, and the operation temperature at the time of the read process is the low temperature, the controller 5 does not execute the temperature-dependent retry read and executes the standard retry read.

As in pattern P4, when the operation temperature at the time of the write process is the high temperature, and the operation temperature at the time of the read process is the high temperature, the controller 5 does not execute the temperature-dependent retry read and executes the standard retry read.

As shown in FIG. 8, in the storage device 1 of the present embodiment, in a case where the operation temperature at the time of the write process is the low temperature, and the operation temperature at the time of the read process is the high temperature, the temperature-dependent retry read which requires measurement of temperature at the time of the read process is executed, and in the other cases, the standard retry read which is faster than the temperature-dependent retry read is executed. Thus, in the present embodiment, the number of temperature-dependent retry reads can be reduced.

The storage device 1 of the present embodiment explained above determines the write attribute based on the operation temperature and generates the attribute data 24 and the temperature data 25 at the time of the write process. The storage device 1 reads data in accordance with a scheme corresponding to the write attribute at the time of the read process. When the read data is not normal, and further, the write attribute is the standard write attribute, the storage device 1 executes the standard retry read in accordance with a scheme corresponding to the write attribute. When the read data is not normal, and further, the write attribute is the high-reliability write attribute, and further, the operation temperature at the time of the read is not greater than or equal to the third threshold, the storage device 1 executes the standard retry read. When the read data is not normal, and further, the write attribute is the high-reliability write attribute, and further, the operation temperature at the time of the read is greater than or equal to the third threshold, the storage device 1 executes the temperature-dependent retry read. In this way, in the present embodiment, for example, even if there is a possibility that the reliability of written data is decreased as the operation temperature is low at the time of the write process, normal data can be read with high probability in accordance with a scheme corresponding to the write attribute.

Hereinafter, this specification compares the storage device 1 of the present embodiment with a storage device of a comparative example, and explains the effectiveness of the storage device 1 of the present embodiment.

In a nonvolatile memory, when the reliability of written data is decreased because of the effect of the temperature at the time of the write process, and data is read at a temperature different from the temperature at the time of the write process, the data may become unreadable. More specifically, for example, in some cases, at the time of operation at a high temperature, it is difficult to normally read the data written to a nonvolatile memory in accordance with a TLC scheme at the time of operation at a low temperature. As a remedy for reading normal data when data cannot be read, retry read is considered.

It is assumed that the storage device of the comparative example writes data to a nonvolatile memory in accordance with a predetermined scheme, and when normal data is not read, the storage device executes temperature-dependent retry read in accordance with the temperature at the time of the read process. In this storage device of the comparative example, the temperature at a time of a write process is not considered. Thus, even if error collection is applied, normal data may not be obtained. The number of temperature-dependent retry reads which require measurement of the temperature at the time of the read process is increased. Thus, the latency of the read process may be increased.

The storage device 1 of the present embodiment selects a high-reliability write attribute in accordance with the operation temperature, writes data in accordance with a scheme corresponding to the selected write attribute, and reads data in accordance with a scheme corresponding to the write attribute in the read process. Moreover, when retry read is executed, the storage device 1 of the present embodiment is allowed to select the temperature-dependent retry read suitable for the operation temperature at the time of the write process and the operation temperature at the time of the read process, or the standard retry read. Further, the storage device 1 of the present embodiment can execute the selected the temperature-dependent retry read or the standard retry read. Thus, in the storage device 1 of the present embodiment, in comparison with the storage device of the comparative example, normal data can be read with high probability, and the number of retry reads can be reduced.

In the storage device of the comparative example, determination by the write attribute determination unit 15 in S705 is not performed at the time of a retry read. Thus, even in a case where the operation temperature at the time of the write process is the high temperature, if the operation temperature at the time of the read process is a high temperature, the temperature-dependent retry read is executed. However, in the storage device 1 of the present embodiment, when the operation temperature at the time of the write process is the high temperature, regardless of the operation temperature at the time of the read process, the standard retry read which can be executed at a higher speed than the temperature-dependent retry read is executed. In this manner, an increase in latency at the time of the read process can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a nonvolatile memory;
a sensor configured to measure temperature; and
a controller configured to control the nonvolatile memory in accordance with the temperature measured by the sensor, wherein
the controller is further configured to select a write scheme based on the temperature measured by the sensor at a time of a write process of data with respect to the nonvolatile memory,
write the data to the nonvolatile memory in accordance with the selected write scheme, and
read the data from the nonvolatile memory in accordance with a scheme corresponding to the write scheme with respect to the data, and wherein
the controller is further configured to
determine whether the data read from the nonvolatile memory is normal,
when the data is not normal, determine whether the write scheme with respect to the data is a first write scheme or a second write scheme with reliability lower than the first write scheme,
when the write scheme is the first write scheme, determine whether the temperature measured by the sensor at the time of the read process is greater than or equal to a first threshold,
when the temperature at the time of the read process is greater than or equal to the first threshold, execute retry read which depends on the temperature, and
when the write scheme is the second write scheme, or when the temperature at the time of the read process is less than the first threshold, execute retry read which does not depend on the temperature.

2. The storage device of claim 1, wherein
the controller is further configured to select a single-level cell (SLC) scheme with respect to the data when the temperature at the time of the write process is less than a second threshold, and select a write scheme allowed to store information of a plurality of bits with respect to one memory cell of the nonvolatile memory when the temperature at the time of the write process is greater than or equal to the second threshold.

3. The storage device of claim 1, wherein
the controller is further configured to select a multiplexing scheme with respect to the data when the temperature at the time of the write process is less than a third threshold, and select a scheme in which multiplexing is not performed when the temperature at the time of the write process is greater than or equal to the third threshold.

4. The storage device of claim 1, wherein
the controller is further configured to generate management data including the write scheme with respect to the data, and
the management data comprises:
address translation data in which a logical address and a physical address related to the data are associated with each other; and
attribute data in which the logical address or the physical address related to the data is associated with the write scheme.

5. The storage device of claim 1, wherein
each of the read process and the write process includes an internal process performed by the controller with respect to the nonvolatile memory.

6. The storage device of claim 5, wherein
the internal process includes at least one of wear leveling or garbage collection with respect to the nonvolatile memory.

7. The storage device of claim 1, wherein
at the time of the write process,
the controller is further configured to
translate a logical address of the data into a physical address,
measure the temperature at the time of the write process by the sensor,
select the write scheme based on the temperature at the time of the write process,
generate management data including the write scheme with respect to the data, and
write the data to the nonvolatile memory in accordance with the write scheme.

8. The storage device of claim 7, wherein
at the time of the read process,
the controller is further configured to
translate the logical address of the data into a physical address,
obtain the write scheme with respect to the data,
read the data in accordance with the scheme corresponding to the write scheme from a location indicated by the physical address of the nonvolatile memory,
determine whether the data read from the nonvolatile memory is normal,
when the data is not normal, determine whether the write scheme with respect to the data is the first write scheme or the second write scheme,
when the write scheme is the first write scheme, determine whether the temperature at the time of the read process measured by the sensor is greater than or equal to the first threshold,
when the temperature at the time of the read process is greater than or equal to the first threshold, execute first retry read which depends on the temperature at the time of the read process, and
when the write scheme is the second write scheme, or when the temperature at the time of the read process is less than the first threshold, execute second retry read which does not depend on the temperature at the time of the read process.

9. The storage device of claim 8, wherein
the controller is further configured to select a single-level cell (SLC) scheme with respect to the data when the temperature at the time of the write process is less than a second threshold, and select a write scheme allowed to store information of a plurality of bits with respect to one memory cell of the nonvolatile memory when the temperature at the time of the write process is greater than or equal to the second threshold.

10. The storage device of claim 8, wherein
the controller is further configured to select a multiplexing scheme with respect to the data when the temperature at the time of the write process is less than a third threshold, and select a scheme in which multiplexing is not performed when the temperature at the time of the write process is greater than or equal to the third threshold.

11. The storage device of claim 8, wherein
in the first retry read, a parameter or a reference table used for the read process is updated using the temperature at the time of the read process, and
in the second retry read, the parameter or the reference table used for the read process is updated without using the temperature at the time of the read process.

12. The storage device of claim 7, wherein
the sensor includes a first temperature sensor provided in the nonvolatile memory, and a second temperature sensor provided in the controller, and the controller is further configured to calculate the temperature based on a first measured value measured by the first temperature sensor and a second measured value measured by the second temperature sensor.

13. The storage device of claim 12, wherein
the controller is further configured to make weight of the first measured value greater than weight of the second measured value to calculate the temperature.

14. A control method of a storage device comprising a nonvolatile memory and a sensor configured to measure temperature, the method comprising:
selecting a write scheme based on the temperature measured by the sensor at a time of a write process of data with respect to the nonvolatile memory;
writing the data to the nonvolatile memory in accordance with the write scheme;
and
reading the data from the nonvolatile memory in accordance with a scheme corresponding to the write scheme with respect to the data, wherein
the method further comprises
determining whether the data read from the nonvolatile memory is normal,
when the data is not normal, determining whether the write scheme with respect to the data is a first write scheme or a second write scheme with reliability lower than the first write scheme,
when the write scheme is the first write scheme, determining whether the temperature measured by the sensor at the time of the read process is greater than or equal to a first threshold,
when the temperature at the time of the read process is greater than or equal to the first threshold, executing retry read which depends on the temperature, and
when the write scheme is the second write scheme, or when the temperature at the time of the read process is less than the first threshold, executing retry read which does not depend on the temperature.

15. The control method of claim 14, further comprising:
at the time of the write process,
translating a logical address of the data into a physical address;
measuring the temperature at the time of the write process by the sensor;
selecting the write scheme based on the temperature at the time of the write process;
generating management data including the write scheme with respect to the data; and
writing the data to the nonvolatile memory in accordance with the write scheme.

16. The control method of claim 15, further comprising:
at the time of the read process,
translating the logical address of the data into a physical address;
obtaining the write scheme with respect to the data;
reading the data in accordance with the scheme corresponding to the write scheme from a location indicated by the physical address of the nonvolatile memory;
determining whether the data read from the nonvolatile memory is normal;
when the data is not normal, determining whether the write scheme with respect to the data is the first write scheme or the second write scheme;
when the write scheme is the first write scheme, determining whether the temperature at the time of the read process measured by the sensor is greater than or equal to the first threshold;
when the temperature at the time of the read process is greater than or equal to the first threshold, executing first retry read which depends on the temperature at the time of the read process; and
when the write scheme is the second write scheme, or when the temperature at the time of the read process is less than the first threshold, executing second retry read which does not depend on the temperature at the time of the read process.

17. The control method of claim 14, further comprising:
selecting a single-level cell (SLC) scheme with respect to the data when the temperature at the time of the write process is less than a second threshold, and selecting a write scheme allowed to store information of a plurality of bits with respect to one memory cell of the nonvolatile memory when the temperature at the time of the write process is greater than or equal to the second threshold.

18. The control method of claim 14, further comprising
selecting a multiplexing scheme with respect to the data when the temperature at the time of the write process is less than a third threshold, and selecting a scheme in which multiplexing is not performed when the temperature at the time of the write process is greater than or equal to the third threshold.

19. The control method of claim 14, wherein
each of the read process and the write process includes an internal process performed in the storage device with respect to the nonvolatile memory.

20. A storage device comprising:
a nonvolatile memory;
a sensor configured to measure temperature; and
a controller configured to control the nonvolatile memory in accordance with the temperature measured by the sensor, wherein
the controller is further configured to
select a write scheme based on the temperature measured by the sensor at a time of a write process of data with respect to the nonvolatile memory,
write the data to the nonvolatile memory in accordance with the selected write scheme, and
read the data from the nonvolatile memory in accordance with a scheme corresponding to the write scheme with respect to the data, and wherein
the controller is further configured to select a multiplexing scheme with respect to the data when the temperature at the time of the write process is less than a threshold, and select a scheme in which multiplexing is not performed when the temperature at the time of the write process is greater than or equal to the threshold.

* * * * *